(12) United States Patent  (10) Patent No.: US 8,157,428 B2
Stenton  (45) Date of Patent: *Apr. 17, 2012

(54) MULTIPLE SOURCE RETICLE ILLUMINATION

(75) Inventor: Conrad Stenton, Midland (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 377 days.

This patent is subject to a terminal disclaimer.

(21) Appl. No.: 11/732,738

(22) Filed: Apr. 4, 2007

(65) Prior Publication Data

US 2008/0247151 A1  Oct. 9, 2008

(51) Int. Cl.
*A61B 1/24* (2006.01)
*F21V 5/00* (2006.01)

(52) U.S. Cl. .......... 362/577; 362/553; 362/558

(58) Field of Classification Search .......... 362/557–560, 362/577, 582, 110, 112, 234–238, 240, 249, 362/252

See application file for complete search history.

(56) References Cited

U.S. PATENT DOCUMENTS

| 5,907,395 | A |  | 5/1999 | Schulz et al. ............ 356/139.03 |
| 5,997,163 | A |  | 12/1999 | Brown .......................... 362/553 |
| 6,779,931 | B2 | * | 8/2004 | Murata et al. ................... 385/98 |
| 6,857,769 | B2 |  | 2/2005 | Brun ............................. 362/517 |
| 7,332,746 | B1 | * | 2/2008 | Takahashi et al. .............. 257/98 |
| 7,428,796 | B1 | * | 9/2008 | Stenton et al. .................. 42/123 |

* cited by examiner

*Primary Examiner* — William Carter
(74) *Attorney, Agent, or Firm* — Christie, Parker & Hale, LLP

(57) ABSTRACT

A reticle illumination system. The novel system includes a fluid material adapted to absorb incident energy and emit fluorescent light to illuminate a target surface, and a first light source for providing the incident energy to pump the fluid material. In an illustrative embodiment, the target surface is a prism surface upon which a reticle is disposed, and the fluid material is a cement or epoxy doped with a fluorescent dye or a suspension of nanodots. The fluorescent cement is applied to the target surface behind the reticle and has an index of refraction matching that of the prism. The system may also include one or more additional light sources that transmit light into the cement and illuminate the reticle either directly or by pumping the fluorescent cement.

36 Claims, 4 Drawing Sheets

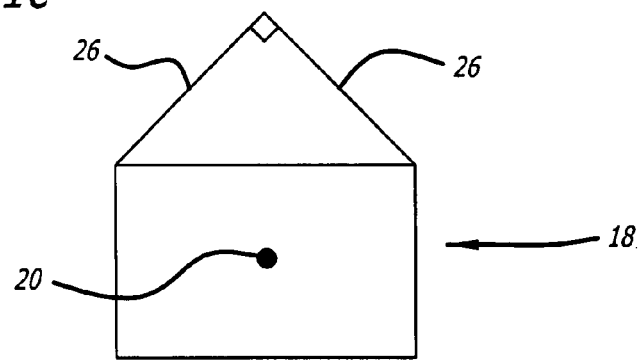
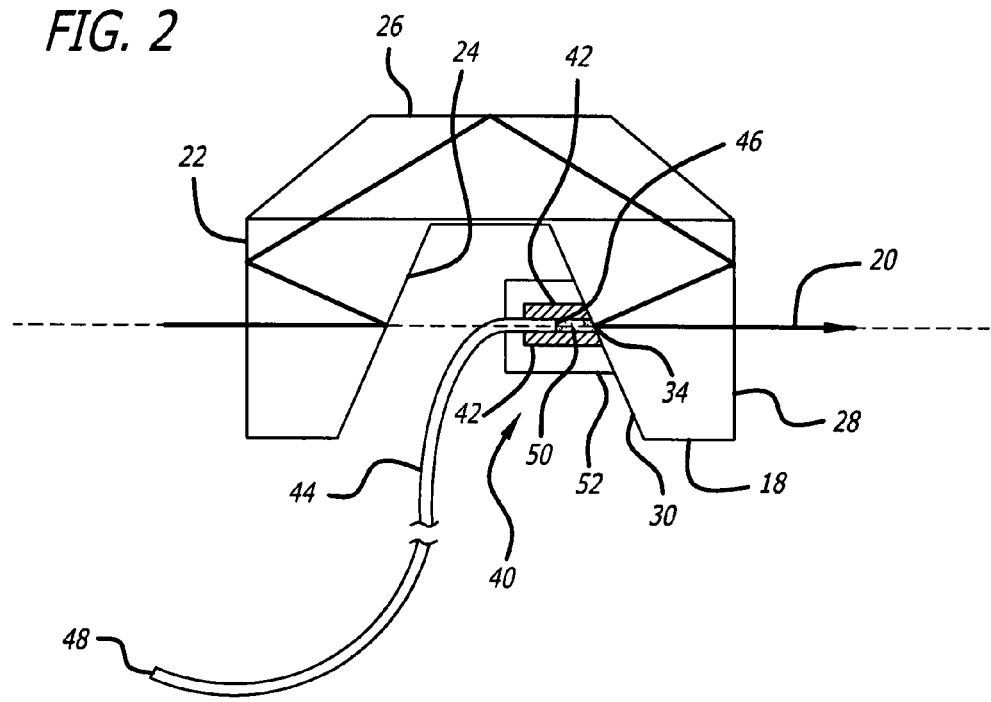

US 8,157,428 B2

MULTIPLE SOURCE RETICLE ILLUMINATION

BACKGROUND OF THE INVENTION

1. Field of the Invention

The present invention relates to optical sights. More specifically, the present invention relates to systems and methods for illuminating a reticle in an optical sight.

2. Description of the Related Art

An optical sight (e.g., a gunsight or scope) is used to accurately aim a device such as a firearm, crossbow, or camera. A conventional optical sight uses a lens system that provides a magnified image of a target for viewing by an observer (the shooter), and typically includes a reticle, which is a pattern (crosshair, circles, dots, etc.) superimposed over the target image that is used by the observer to align the device.

Reticles often need to be illuminated. Optical sights for military applications often use a radioactive light source, such as tritium, for illuminating the reticle. Tritium light, however, is dim, making it suitable for nighttime operation but not for daytime use. LED light sources can provide brighter illumination of the reticle, but LEDs typically require a battery that needs to be frequently replaced, and which may fail at an inopportune time.

Fluorescent fibers or light pipes are another source for providing daytime illumination. A fluorescent fiber absorbs ambient light (e.g., daylight) and converts it to a bright fluorescent beam, which is used to illuminate the reticle. A fiber can provide daytime reticle illumination without the need for an external power source, but will not work under conditions of low ambient light (e.g., at night).

An optical sight capable of both day and night time use, which does not require an external power source, is highly desirable, especially for use in military applications. No single light source, however, is optimal for both conditions. A solution would be to include multiple illumination sources in the sight: a source suitable for daytime operation, such as a fluorescent fiber, and a source suitable for nighttime operation, such as tritium. The limited space and optical geometry of a typical sight, however, can make it very difficult to couple light from different sources to efficiently illuminate the reticle.

Hence, a need exists in the art for an improved system or method for coupling light from multiple sources to illuminate a reticle in an optical sight.

SUMMARY OF THE INVENTION

The need in the art is addressed by the reticle illumination system of the present invention. The novel system includes a fluid material adapted to absorb incident energy and emit fluorescent light to illuminate a target surface, and a first light source for providing the incident energy to pump the fluid material. In an illustrative embodiment, the target surface is a prism surface upon which a reticle is disposed, and the fluid material is a cement or epoxy doped with a fluorescent dye or a suspension of nanodots. The fluorescent cement is applied to the target surface behind the reticle and has an index of refraction matching that of the prism. The system may also include one or more additional light sources that transmit light into the cement and illuminate the reticle either directly or by pumping the fluorescent cement.

BRIEF DESCRIPTION OF THE DRAWINGS

FIG. 1c is a frontal view of an erector prism used in an optical sight designed in accordance with an illustrative embodiment of the present teachings.

FIG. 2 is a simplified schematic of a reticle illumination system designed in accordance with an illustrative embodiment of the present invention, showing also the erector prism of the optical sight.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
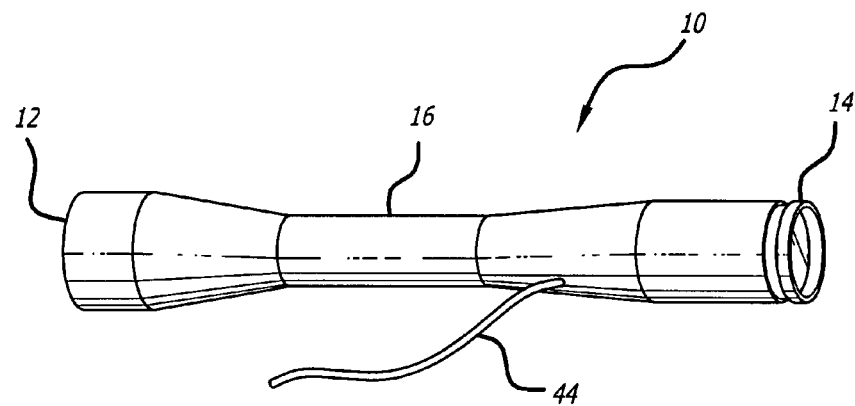
FIG. 1a is an illustration of an optical sight designed in accordance with an illustrative embodiment of the present teachings.
Figure 1B:
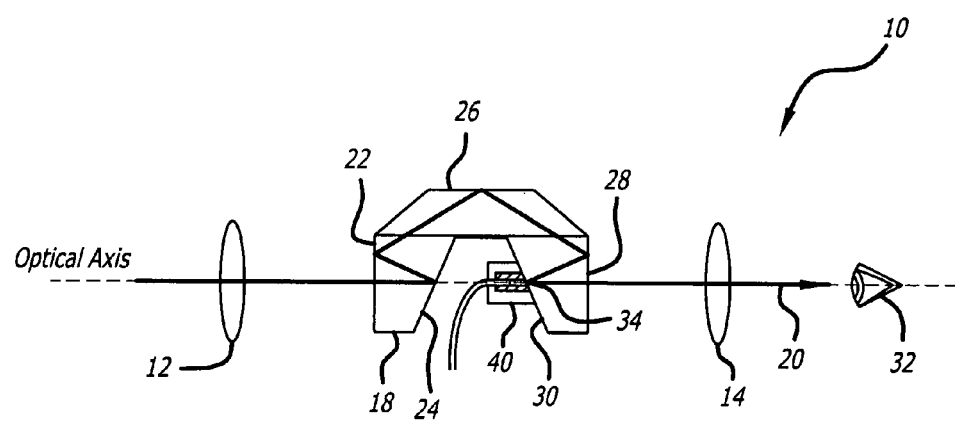
FIG. 1b is a simplified optical schematic of an optical sight designed in accordance with an illustrative embodiment of the present teachings.

FIG. 1a is an illustration of an optical sight 10 with a rear illuminated reticle designed in accordance with an illustrative embodiment of the present teachings. FIG. 1b is a simplified optical schematic of the optical sight 10 shown in FIG. 1a. The illustrative optical sight 10 includes an objective lens 12 and an eyepiece 14 disposed within a housing 16. An imaging erecting prism (erector prism) 18 is provided between the objective lens 12 and the eyepiece 14 to shorten the optical path and to provide an image with proper right to left and up and down orientation when viewed through the eyepiece 14.

As shown in FIG. 1b, light 20 from a target scene is collected by the objective lens 12 and passes through a first surface 22 of the erector prism 18, which is normal to the optical axis. The light 20 reflects off a second surface 24 of the prism 18 back towards the first surface 22 at an angle such that it reflects off the first surface 22 towards a third surface 26, which is a roof. FIG. 1c is a frontal view of the erector prism 18, as viewed from the eyepiece, showing the roof 26. The light 20 is reflected off the roof 26 and strikes a fourth surface (the exit surface) 28 at an angle such that it reflects off the exit surface 28 towards a fifth surface (the reticle surface) 30. The light 20 then reflects off of the reticle surface 30, out through the exit surface 28 of the prism 18 and through the eyepiece 14 to the eye 32 of the observer.

A reticle 34 is etched onto the reticle surface 30 of the erector prism 18. In the illustrative embodiment, the reticle surface 30 is a mirrored surface having a reflective coating, and the reticle pattern 34 is formed on the reticle surface 30 by etching the pattern through the reflective coating. The reticle 34 is located at the focal point of both the objective lens 12 and the eyepiece 14. The observer 32 therefore sees the reticle pattern 34 superimposed over the target image.

In accordance with the present teachings, a novel reticle illumination system 40 is placed behind the reticle 34. FIG. 2 is a simplified schematic of an illumination system 40 designed in accordance with an illustrative embodiment of the present invention, showing also the erector prism 18 of the optical sight 10. The illumination system 40 uses two or more different light sources. In the illustrative embodiment, the illumination system 40 includes an artificial light source 42 (such as tritium) suitable for nighttime operation, and a fluorescent fiber or light pipe 44 that is suitable for daytime operation.

The fluorescent fiber 44 is an optical fiber doped with a fluorescent dye that absorbs incident energy and re-emits energy at a specific wavelength. Ambient light passes through the surface of the fiber 44 and pumps the dye, causing it to fluoresce. The fluorescent light is then trapped within the fiber by total internal reflection, traveling through the length of the fiber 44 until it exits through a first fiber end surface 46. The opposite end 48 of the fiber 44 may be a reflective surface, reflecting the fluorescent light back towards the exit end 46. The exit end 46 of the fiber 44 is disposed within an illumination system housing 52, along with the tritium sources 42. The rest of the fiber 44 snakes outside of the sight housing 16 (as shown in FIG. 1a) such that ambient light will strike the length of the fiber 44. In an illustrative embodiment, the fiber 44 is 0.5 m long and may be wound up and positioned for maximum light absorption.

The exit end 46 of the fiber 44 is placed at a predetermined distance away from the reticle surface 30 such that light exiting the fiber 44 fills the eyepiece exit pupil with a uniformly illuminated reticle. The gap between the fiber end 46 and the reticle surface 30 is filled with a material 50 having an index of refraction matching that of the prism 18 to improve coupling. In an illustrative embodiment, the gap material 50 is a high-viscosity fluid or "goo" such as a glue or epoxy.

As described in a pending patent application 11/706,814 entitled "SYSTEM AND METHOD FOR RETICLE ILLUMINATION" by W. C. Stenton, the teachings of which are incorporated herein by reference, adding an index-matching fluid 50 between the fiber 44 and prism 18 minimizes refraction of light traveling from the fiber 44 to the eyepiece 14 and provides an entry point for additional light sources such as the tritium 42.

Figure 3A:
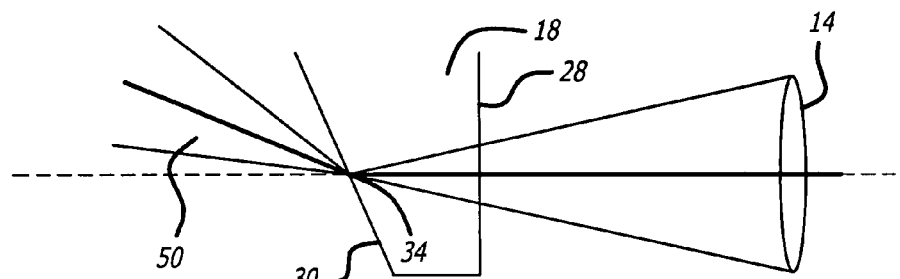
FIG. 3a is a schematic showing the optical path of the reticle illumination if the material behind the reticle surface is not index-matched to the prism.

FIG. 3a is a schematic showing the optical path of the reticle illumination if the material 50 behind the reticle surface 30 is not index-matched to the prism 18 (for example, if it is left as air). Because the reticle surface 30 is at an angle to the optical axis, light passing through the surface will be refracted if the material 50 does not have an index of refraction matching that of the prism 18. The fiber 44 would need to be angled (relative to the optical axis) in order to maximize illumination. This may present difficulties in packaging.

Figure 3B:
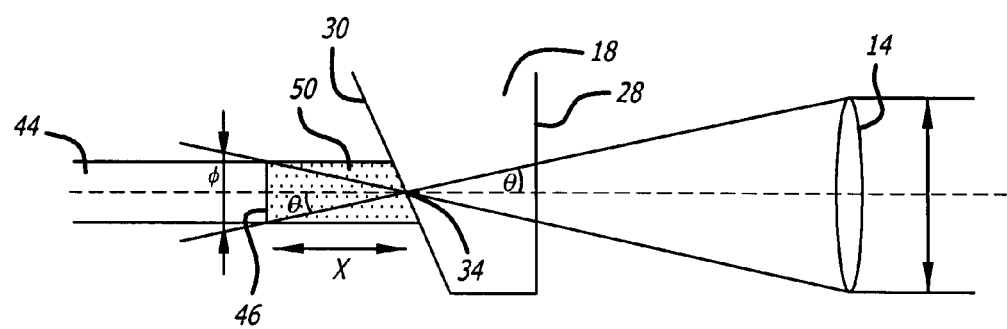
FIG. 3b is a schematic showing the optical path of the reticle illumination if the material behind the reticle surface is index-matched to the prism in accordance with an illustrative embodiment of the present invention.

FIG. 3b is a schematic showing the optical path if the material 50 behind the reticle surface 30 is index-matched to the prism 18. Light from the fiber 44 is not refracted, and will travel straight through the prism 18 along the optical axis towards the eye 32. This provides advantages in packaging and also provides a place to introduce other light sources (such as the tritium 42).

Therefore, in the preferred embodiment, the gap between the fiber 44 and the prism 18 is filled with a material having an index of refraction matching that of the prism 18, such that the fiber 44 can be placed parallel to the optical axis. In order to fill the eyepiece exit pupil with a uniformly illuminated reticle, the fiber exit end 46 should be positioned at a distance x from the reticle surface 30 such that the fiber diameter $\phi$ is larger than or equal to the cone having a cone angle $\theta$ defined by the exit pupil. In a preferred embodiment, the fiber 44 is positioned such that the fiber diameter $\phi$ is equal to the cone defined by the exit pupil (as shown in FIG. 3b) to maximize illumination from the fiber 44.

Returning to FIG. 2, the tritium source 42 is placed next to the index-matching material 50, such that the beta light generated by the tritium 42 enters the material 50. As described in the above-mentioned patent application, light from the tritium source 42 can be coupled to the reticle surface 30 by including some mechanism for redirecting the light. For example, the light may be reflected and scattered off of the exit surface 46 of the fiber 44 back towards the reticle 34, or the material 50 may be doped with a plurality of scattering centers that scatter the light so that some light is redirected towards the reticle 34.

In accordance with the present teachings, light from the tritium (or other light) source 42 is coupled to the reticle surface 30 using fluorescence. In an illustrative embodiment, the index-matching material 50 is doped with a fluorescent dye that absorbs light from the tritium source 42 and emits fluorescent light at a particular wavelength. The fluorescent light is trapped within the material 50 by total internal reflection until it exits through the reticle surface 30 towards the eyepiece 14. In a preferred embodiment, the index-matching material 50 is doped with a suspension of nanodots 54 (shown in FIGS. 4a and 4b), which are small particles (quantum dots) that fluoresce when illuminated, similar to fluorescent dye. Nanodots can convert incident energy to fluorescent light with very high efficiency, and can be brighter and more stable than conventional dyes.

In the illustrative embodiment, the reticle illumination system 40 includes two light sources: a fluorescent fiber 44 whose output directly illuminates the reticle 34 after traveling straight through the index-matching material 50, and a tritium source 42 that pumps the fluorescent dye in the material 50 to generate fluorescent light that illuminates the reticle 34. Other configurations are also possible. For example, the fiber 44 may also be adapted to pump the fluorescent material 50, or it can be replaced with a different type of light source (such as an LED), which may directly illuminate the reticle 34 or pump the fluorescent material 50 (depending on the wavelength of the light and the absorption spectrum of the fluorescent material 50). The tritium 42 could also be replaced with a different type of light source, which could be a second fiber. In addition, the system 40 could also include more light sources, each source transmitting light into the material 50 to pump the fluorescent material 50 and/or to be redirected towards the reticle 34 by scattering centers.

Figure 4A:
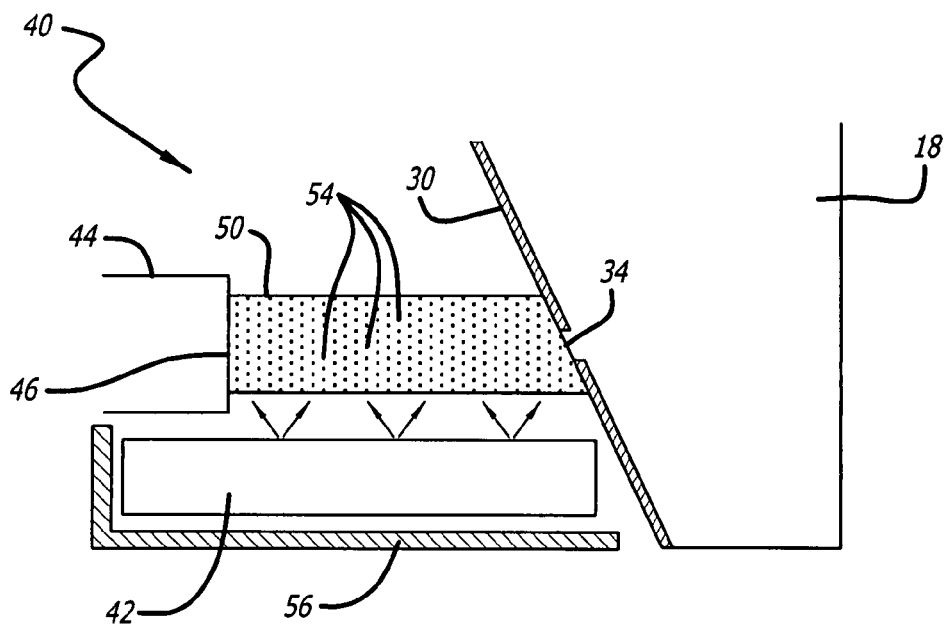
FIG. 4a is a schematic of a reticle illumination system designed in accordance with an illustrative embodiment of the present invention.
Figure 4B:
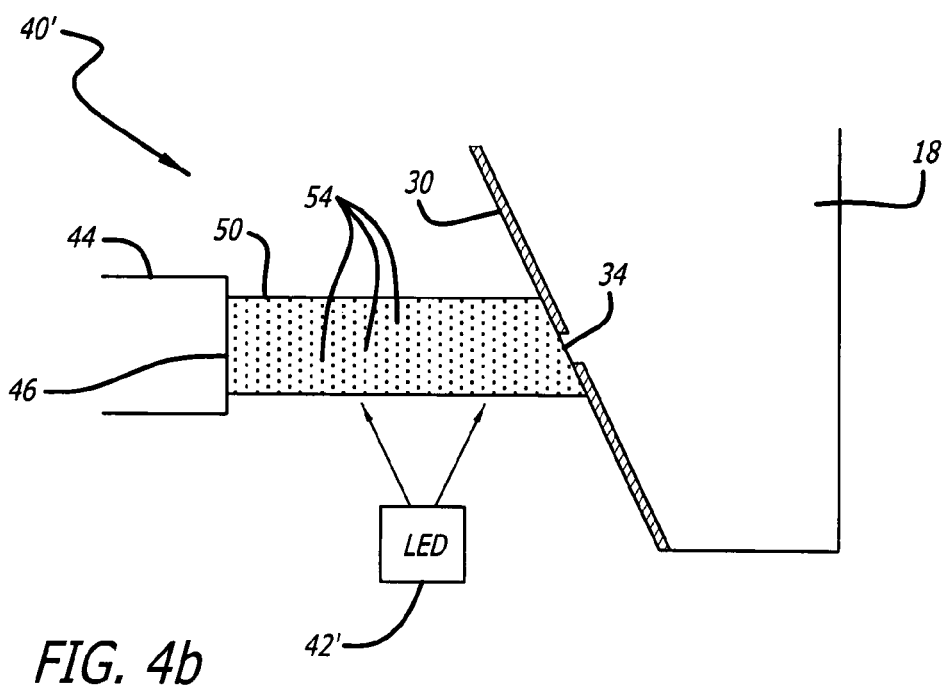
FIG. 4b is a schematic of an alternative reticle illumination system designed in accordance with an illustrative embodiment of the present invention.

FIGS. 4a and 4b are simplified schematics of reticle illumination systems 40 and 40' designed in accordance with illustrative embodiments of the present invention, showing two possible configurations. In FIG. 4a, the system 40 includes a fiber 44 and a tritium source 42. The system may also include a reflector 56 for reflecting light from the tritium 42 back towards the fluorescent material 50. In FIG. 4b, the system 40' includes a fiber 44 and an ultraviolet (UV) or visible light LED light source 42', which is adapted to pump the fluorescent dye 54 in the index-matching material 50.

Thus, the teachings of the present invention provide a reticle illumination system 40 that uses a fluorescent material 50 to couple light from multiple sources to the reticle 34. One can think of the material 50 as a transparent integrating sphere, not 100% efficient but able to take light from many directions and by fluorescence, scatter, or a combination of both redirected and pumped illumination, illuminate a reticle 34 from behind. In a preferred embodiment, the index-matching material 50 is a high-viscosity fluid to eliminate any air gaps between the material 50 and the prism 18 or the fiber 44, and to eliminate the need for a container for the fluid. A good material to use may be a cement or other epoxy formulated for gluing optical components. The glue can then be doped with nanodots or fluorescent dye.

In an illustrative embodiment, the illumination system 40 includes a fluorescent fiber 44 that provides brighter illumination for daytime operation and a tritium source 42 that pumps the fluorescent cement 50 during both day- and nighttime operation. The fluorescent cement 50 may also be pumped by multiple fibers, tritium sources, LEDs, or any combination of the above or other sources of UV or visible light.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for illuminating a reticle disposed on a target surface of a prism, said system comprising:
   a first light source positioned to output a first light in a first direction, wherein said first direction is not toward said reticle;
   a second light source positioned to output a second light in a second direction, wherein said second direction is toward said reticle; and
   a fluid material disposed between said second light source and said target surface and adapted to transmit said second light from said second light source to said prism to illuminate said reticle and wherein said fluid material is also adapted to receive said first light from said first light source and redirect said first light toward said reticle using fluorescent means for absorbing incident energy from said first light source and emitting fluorescent light toward said reticle.

2. The invention of claim 1 wherein said fluid material is a high-viscoity, fluid.

3. The invention of claim 1 wherein said fluid material is a glue or epoxy.

4. The invention of claim 1 wherein said fluid material is a cement formulated for gluing optical components.

5. The invention of claim 1 wherein said fluorescent means includes a fluorescent dye.

6. The invention of claim 1 wherein said fluorescent means includes a suspension of quantum dots.

7. The invention of claim 1 wherein said fluid material is disposed in contact with said target surface.

8. The invention of claim 7 wherein said fluid material has an index of refraction matching that of said target surface.

9. The invention of claim 8 wherein said fluorescent light is trapped in said fluid material by total internal reflection until it exits said material through said target surface.

10. The invention of claim 1 wherein said first light source is a tritium light source.

11. The invention of claim 1 wherein said fluid material is adapted to transmit light from said second light source to said prism to illuminate said reticle directly.

12. The invention of claim 1 wherein said second light source includes an optical fiber adapted to receive ambient light and output light toward said target surface.

13. The invention of claim 12 wherein an exit end of said fiber is located a predetermined distance away from said target surface.

14. The invention of claim 13 wherein said fluid material fills a gap between said exit end of said fiber and said target surface such that there are no air gaps between said fiber, material, and target surface.

15. The invention of claim 13 wherein said exit end of said fiber is positioned at a distance away from said target surface such that a diameter of said fiber is larger than or equal to a cone defined by an exit pupil of said system.

16. The invention of claim 12 wherein said fiber is a fluorescent fiber.

17. The invention of claim 1 wherein said system further includes one or more additional light sources adapted to pump said fluid material to generate said fluorescent light.

18. The invention of claim 1 wherein said system further includes means for reflecting light in said fluid material.

19. The invention of claim 18 wherein said fluid material is doped with a plurality of scattering centers that reflect light so that some light illuminates said target surface.

20. The invention of claim 1 wherein said second direction is along an optical axis of said system and said first direction is not along said optical axis.

21. The invention of claim 20 wherein said fluid material is adapted to redirect said light from said first light source such that it travels along said optical axis.

22. The invention of claim 1 wherein said fluid material has an index of refraction matching that of said target surface, and a gap between said second light source and said target surface is filled by said fluid material such that said second light travels directly from said second light source through said fluid material to said target surface.

23. A reticle illumination system for illuminating a reticle disposed on a reticle surface of a prism, said system comprising:
   a first light source adapted to output a first light in a first direction, wherein said first direction is toward said reticle;
   a second light source adapted to output a second light in a second direction, wherein said second direction is not toward said reticle; and
   a fluorescent cement disposed between said first light source and said reticle surface and adapted to transmit light from said first light source to said prism to illuminate said reticle, and wherein said cement is also adapted to receive said second light from said second source and redirect said second light toward said reticle by absorbing said second light from said second light source and emitting fluorescent light toward said reticle.

24. The invention of claim 23 wherein said first light source includes an optical fiber adapted to collect ambient light and output light toward said reticle, said fiber having an exit end located a predetermined distance away from said reticle surface.

25. The invention of claim 24 wherein said fluorescent cement fills a gap between said exit end of said fiber and said reticle surface such that there are no air gaps between said fiber, fluorescent cement, and prism.

26. The invention of claim 23 wherein said light from said first light source also pumps said fluorescent cement.

27. The invention of claim 23 wherein said fluorescent cement is disposed in contact with said reticle surface.

28. The invention of claim 23 wherein said fluorescent cement has an index of refraction matching that of said prism.

29. The invention of claim 23 wherein said fluorescent cement includes a cement doped with a fluorescent dye.

30. The invention of claim 23 wherein said fluorescent cement includes a cement doped with a suspension of quantum dots.

31. The invention of claim 23 wherein said second light source is a tritium source.

32. The invention of claim 23 wherein said system further includes one or more additional light sources adapted to pump said fluorescent cement.

33. The invention of claim 23 wherein said fluorescent cement is doped with a plurality of scattering centers that reflect light so that some light illuminates said reticle.

34. An optical sight comprising:
- an objective lens for receiving light from a target scene and forming a target image;
- an eyepiece lens for outputting said target image;
- an image erecting prism disposed between said objective and eyepiece lenses;
- a reticle disposed on a reticle surface of said prism;
- a first light source adapted to output a first light in a first direction toward said reticle along an optical axis of said sight;
- a second light source adapted to output a second light in a second direction wherein said second direction is not toward said reticle; and
- a fluid material disposed between said first light source and said reticle surface and adapted to transmit said first light from said first light source to said prism to illuminate said reticle and wherein said fluid material is also adapted to receive said second light from said second light source and redirect said second light toward said reticle by absorbing said second light from said second light source and emitting fluorescent light toward said reticle.

35. A method for illuminating a reticle in an optical sight having a reticle disposed on a target surface of a prism, said method including the steps of
- positioning a first light source a predetermined distance away from said target surface such that a first light output by said first light source is directed in a first direction toward said reticle;
- applying a fluid material to said prism behind said reticle between said first light source and said target surface such that said fluid material transmits light from said first light source to said prism to illuminate said reticle; and
- positioning a second light source such that a second light output by said second light source travels in a second direction not toward said reticle, but toward said fluid material, wherein said fluid material is adapted to receive said second light from said second light source and redirect said second light toward said reticle by absorbing incident energy from said second light source and emitting fluorescent light toward said reticle.

36. The invention of claim 35 wherein said method further includes pumping said fluid material with one or more additional light sources.

* * * * *